US012145247B2

(12) United States Patent
Korper

(10) Patent No.: US 12,145,247 B2
(45) Date of Patent: Nov. 19, 2024

(54) CLAMP ASSEMBLY

(71) Applicant: Stephen Joseph Korper, Ormond Beach, FL (US)

(72) Inventor: Stephen Joseph Korper, Ormond Beach, FL (US)

( * ) Notice: Subject to any disclaimer, the term of this patent is extended or adjusted under 35 U.S.C. 154(b) by 0 days.

(21) Appl. No.: 18/351,131

(22) Filed: Jul. 12, 2023

(65) Prior Publication Data

US 2024/0017380 A1 Jan. 18, 2024

Related U.S. Application Data

(60) Provisional application No. 63/368,429, filed on Jul. 14, 2022.

(51) Int. Cl.
*B25B 5/10* (2006.01)
*F16B 5/00* (2006.01)

(52) U.S. Cl.
CPC .................................... *B25B 5/10* (2013.01)

(58) Field of Classification Search
CPC .... B25B 5/10; B25B 5/06; B25B 5/00; B25B 1/125; F16B 5/0068
See application file for complete search history.

(56) References Cited

U.S. PATENT DOCUMENTS 1,828,758 A * 10/1931 Zimmerman ......... B25B 27/308 29/256
3,469,810 A * 9/1969 Dorris ....................... F16B 2/12 248/245
3,796,405 A * 3/1974 Rystad ....................... E06B 3/02 248/316.7
4,281,826 A * 8/1981 Calvert ................... B25B 5/003 269/154
4,836,517 A * 6/1989 Vossler ................... E04G 21/26 269/904
4,960,269 A * 10/1990 Fong ..................... B25B 1/2405 269/224
5,388,813 A * 2/1995 Arsenault ............ E04F 21/185 269/282
6,330,768 B1 12/2001 Rodrigues
6,340,154 B1 1/2002 Young
6,491,294 B1 * 12/2002 Hyatt ...................... B25B 5/145 269/155
6,722,643 B1 4/2004 Kurtz
(Continued)

*Primary Examiner* — Lawrence Averick
(74) *Attorney, Agent, or Firm* — Dunlap Bennett & Ludwig, PLLC

(57) ABSTRACT

A clamp assembly for selectively securing a movable object relative to a fixed object is provided. The clamp assembly enables a movable object to be selectively disposing relative to an adjacent fixed object, within a space defined in part by the adjacent fixed object and another fixed object. The clamp assembly has a frame providing a slot for the movable object and a jack portion for the adjacent fixed object. The jack portion has a threaded support rod mated with a threaded fastener. The support rod ends in an engagement surface that applies a selective amount of force against the fixed object, and thus applies an opposing force against the movable object within the slot, depending on the selective amount of mating of the support rod and the threaded fastener. Thereby, a user may position the movable object in a spaced apart relationship with the adjacent fixed object.

2 Claims, 4 Drawing Sheets

(56) References Cited

U.S. PATENT DOCUMENTS

| | | | | |
|---|---|---|---|---|
| 7,156,806 | B2 * | 1/2007 | Dobrovolny | A61B 17/02 600/230 |
| 7,395,775 | B2 | 7/2008 | LaScala | |
| 8,079,566 | B1 | 12/2011 | Hurst | |
| 8,191,336 | B2 | 6/2012 | Roberts et al. | |
| 8,695,957 | B2 * | 4/2014 | Quintania | A61B 90/57 269/74 |
| 2006/0021373 | A1 | 2/2006 | Oh et al. | |
| 2007/0101667 | A1 * | 5/2007 | Sweet | E06B 9/02 52/202 |
| 2008/0196333 | A1 | 8/2008 | Tyler | |
| 2012/0073201 | A1 | 3/2012 | Duffany et al. | |

* cited by examiner

CLAMP ASSEMBLY

CROSS-REFERENCE TO RELATED APPLICATION

This application claims the benefit of priority of U.S. provisional application No. 63/368,429, filed 14 Jul. 2022, the contents of which are herein incorporated by reference.

BACKGROUND OF THE INVENTION

The present invention relates to tools and, more particularly, to clamping assembly.

A traditional clamp is a fastening device used to hold or secure objects tightly together to prevent movement or separation through the application of inward pressure. When removably securing a semi-moveable object in a space defined and bounded by two opposing fixed objects, such as within the bounds of fenestration framing, between a tabletop and the floor, or within a cabinet or other compartment space, traditional clamp assemblies are inadequate. Also prior art solutions for attaching a semi-movable object between two fixed objects is replete with permanent attachment assemblies, thereby prohibiting selectively adjusting the semi-movable object and preventing easily interchanging it with another object.

Furthermore, other solutions for removably securing a replaceable object in a spaced-apart arrangement relative to a fixed object, often damage the installation surfaces of one or more of the objects. In addition, clamps assemblies in the prior art may not provide the correct leverage or angle for a clamped item.

As can be seen, there is a need for a clamp assembly that removably selectively secures an object relative to and within a space bound by two fixed objects.

SUMMARY OF THE INVENTION

The present invention embodies a clamp assembly adapted to selectively apply opposing forces between a movable object and a fixed object, thereby selectively securing movable object in a spaced apart arrangement relative to the fixed object.

The clamp assembly of the present invention is dimensioned and adapted to not damage items being clamped as well as provide a better angle when moving to an expanded condition to apply opposing pressure.

In one aspect of the present invention, clamp assembly for selectively securing a movable object relative to a fixed object, the clamp assembly providing the following: a slot configured to receive an end of the movable object; a jack portion adjacent the slot; and a threaded shaft terminating an engagement surface, wherein the engagement surface is configured to engage the fixed object, and wherein the threaded shaft is operatively associated with the jack portion so that selectively moving the threaded shaft in a first direction urges the slot linearly in a second direction away from the engaged fixed object.

In another aspect of the present invention, the clamp assembly further provides wherein the slot is open in the second direction, and wherein the slot is defined by an end portion and two side portions, wherein the end portion interfaces with the movable object, wherein an outer surface of one of the two side portions provides a property indicium, wherein the property indicium identifies a dimensional property of the slot, wherein the jack portion provides a threaded fastener restrained relative to the slot, wherein the threaded fastener and the threaded shaft are selectively mated, wherein the jack portion provides two spaced apart flanges that restrains the threaded fastener, wherein the engagement surface is a distal surface of a threaded knob secured to a distal end of the threaded shaft.

In yet another aspect of the present invention, a method of selectively securing a movable panel relative to a fixed object includes the following: engaging an edge of the movable panel in a slot of the clamping assembly disclosed above; mating the threaded shaft through the threaded fastener until the engagement surface engages the fixed object; and further mating the threaded shaft until said edge of the movable panel is spaced apart from the fixed object.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

A general overview of the various features of the invention will be provided, with a detailed description following. Broadly, an embodiment of the present invention provides a clamp assembly for selectively securing a movable object relative to a fixed object. The clamp assembly advantageously does not damage the installation surfaces of the movable and fixed objects. The clamp assembly enables a movable object to be selectively disposing relative to an adjacent fixed object, within a space defined in part by the adjacent fixed object and another fixed object. The clamp assembly has a frame providing a slot for the movable object and a jack portion for the adjacent fixed object. The jack portion may provide two spaced apart flanges for receiving a threaded fastener so that a threaded support rod may be selectively mated with the threaded fastener. The support rod ends in an engagement surface that applies a selective amount of force against the fixed object, and thus applies an opposing force against the movable object within the slot, depending on the selective amount of mating of the support rod and the threaded fastener. Thereby, a user may position the movable object in a spaced apart relationship with the adjacent fixed object.

The clamping assembly may function as a clamp with a slot for securing semi-movable or interchangeable objects. For example, plywood may fit into a compartment or slot associated with an indicium. For example, the compartment/slot may be marked by a ½ " indicium, as the compartment/ slot is dimensioned to receive movable object (say, a panel) having a thickness of ½ ". A threaded rod and a corresponding, mated top piece may be used to clamp onto an adjacent fixed object, such as a window frame; thus, holding the panel over the window. In another example, the top piece may be placed on a surface underneath a desk. The bolt can be screwed in or out of the top piece to raise or lower the desk. In this use, the marked compartment may slide into a sideboard of the desk from the bottom.

Figure 5:
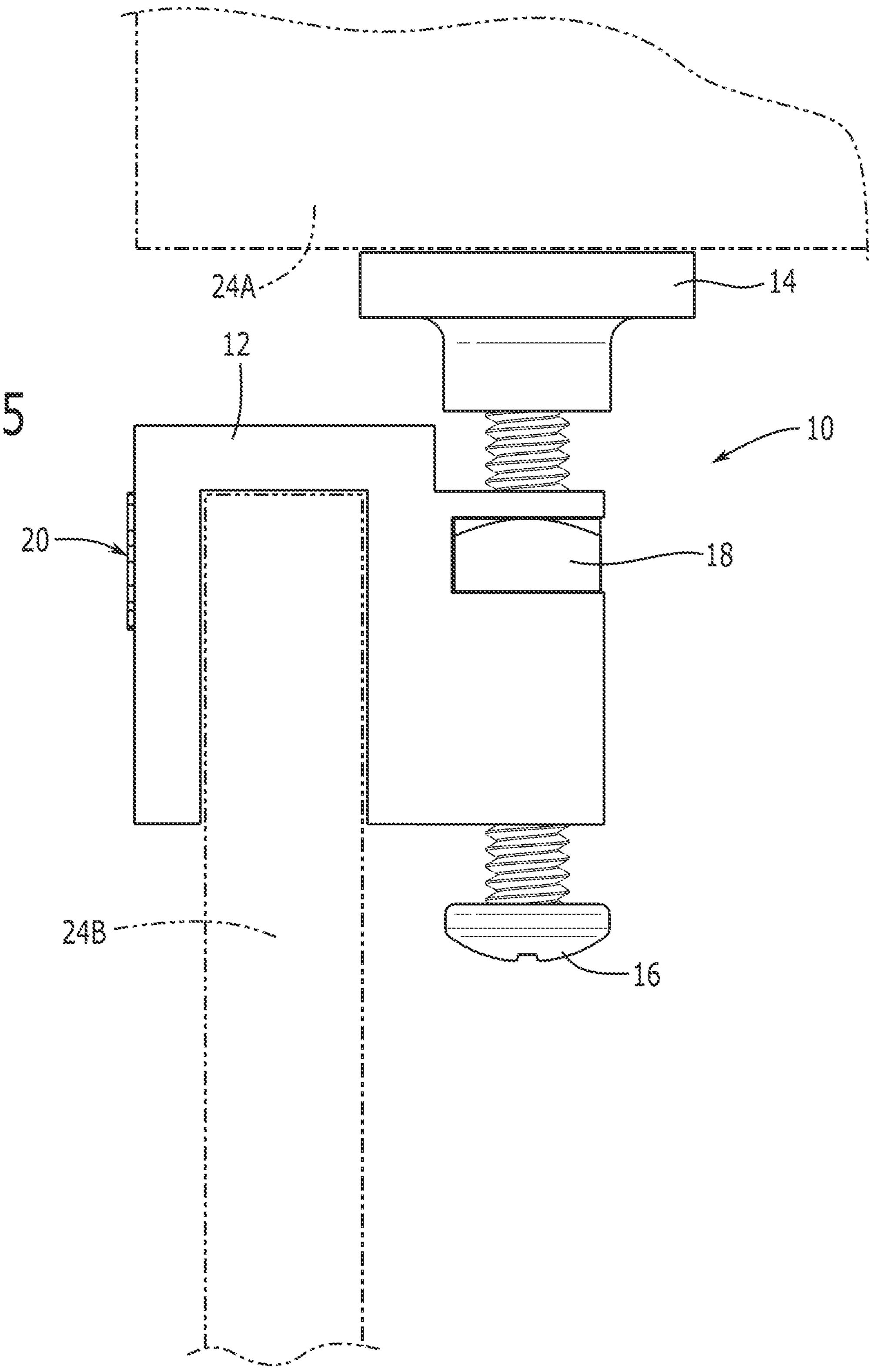
FIG. 5 is a side elevation view of an exemplary embodiment of the present invention, shown in use.

The present invention may include a clamp assembly 10 utilized to apply opposing forces between a fixed object 24A and an interchangeable object 24B. The fixed object 24A may be, as shown in FIG. 5, at a higher elevation than (or "above") the interchangeable object 24B. Alternatively, the fixed object 24A may be at a lower elevation than ("below") the interchangeable object 24B, even though this is not shown in the appended Figures. Likewise, even though not shown in the appended Figures, the present invention contemplates where the interchangeable object 24B and the fixed object 24A are at the same elevation—a lateral orientation—as long as the present invention works as disclosed herein. In other words, the clamp assembly 10 applies linearly opposing pressure between the fixed object 24A and the interchangeable object 24B to secure the latter in a spaced apart arrangement relative to the former, typically within a spaced defined by the fixed object 24B and another, space apart fixed object.

Figure 1:
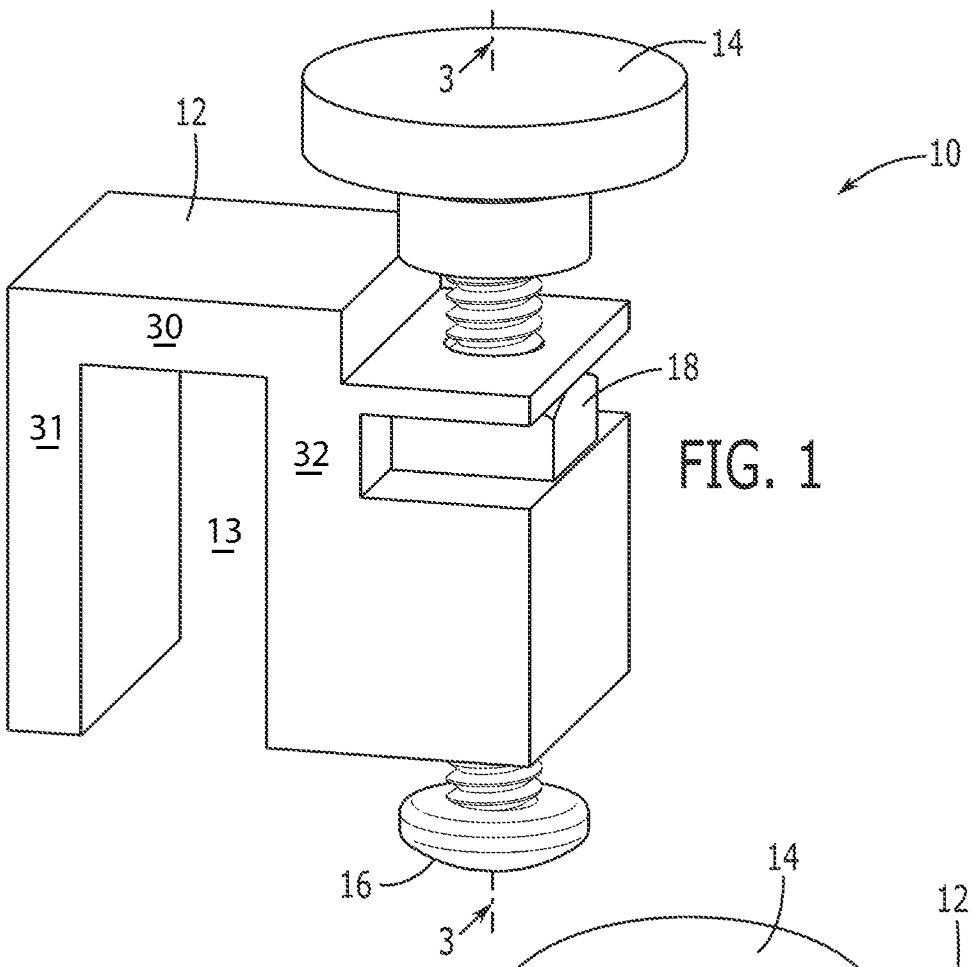
FIG. 1 is a top perspective view of a clamp according to an embodiment of the present invention.
Figure 2:
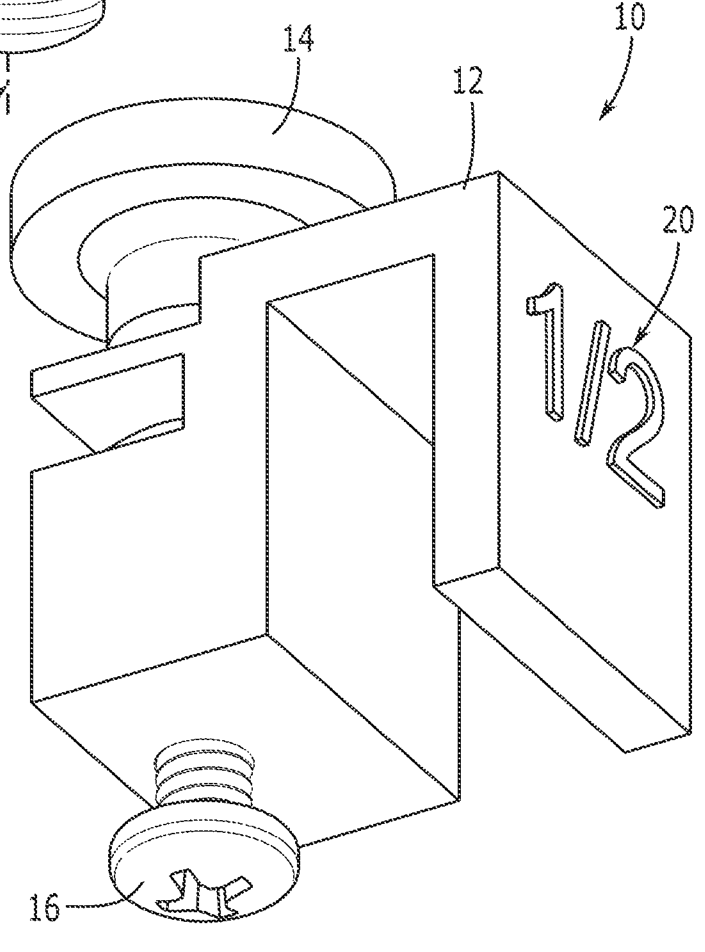
FIG. 2 is a bottom perspective view of an exemplary embodiment of the present invention.
Figure 3:
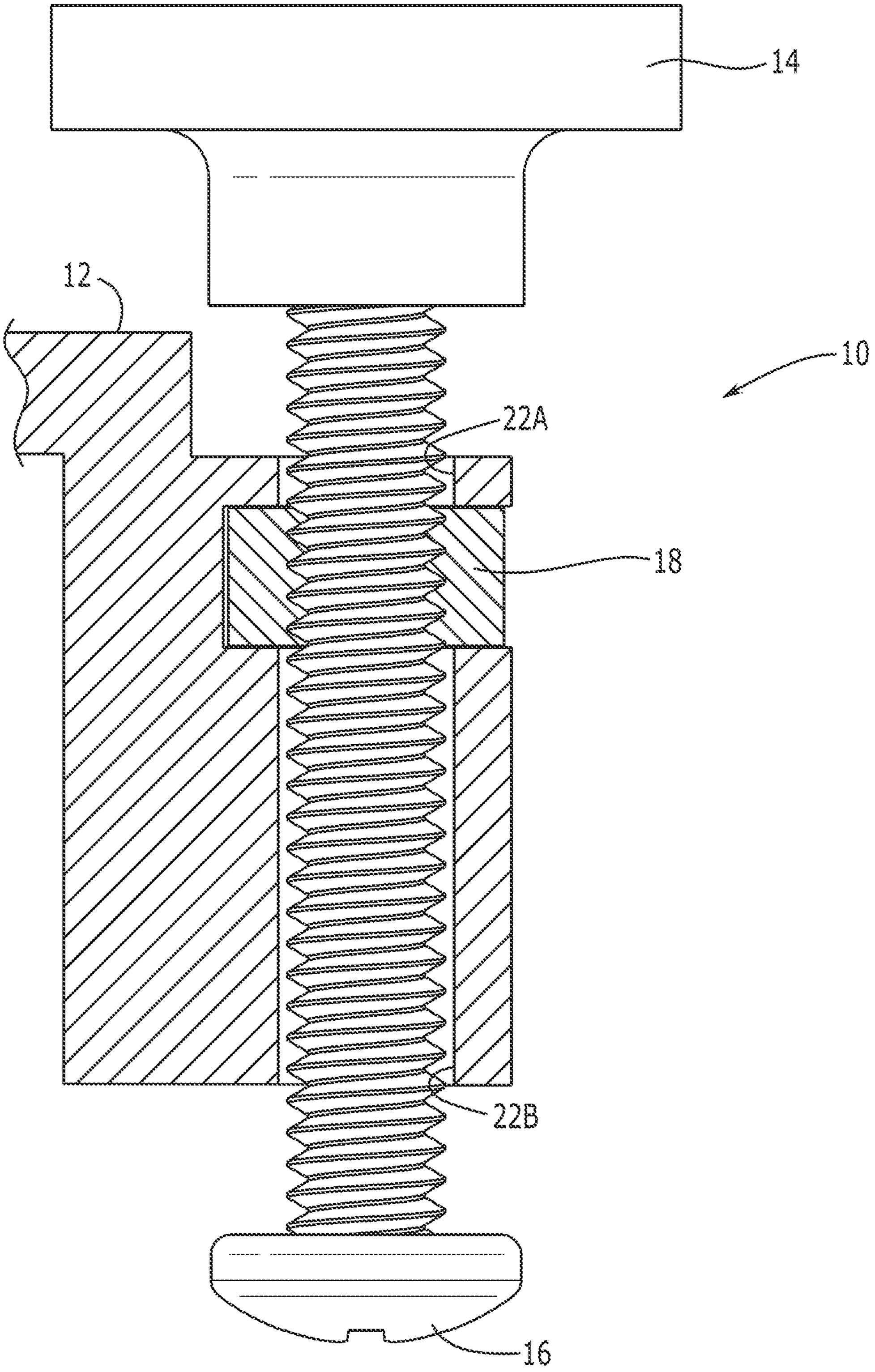
FIG. 3 is a partial cross-sectional view taken on line 3-3 of FIG. 1.

The clamp assembly 10 provides a frame 12 for supporting the interchangeable object 24B. The frame 12 may include a slot 13 defined by an end portion 30 and two opposing side portions 31, 32, as indicated on FIG. 1. The end portion 30 forcibly engages an edge or end portion of the interchangeable object 24B in a primary direction, while the two side portions 31, 32 restrain the interchangeable object 24B from moving in a direction orthogonal to the primary directions.

The two side portions 31, 32 may be defined as a first side portion 31 and a second side portion 32. The first side portion 31 may provide an outward facing surface having an indicia 20. Outward facing may be a surface of the first side portion 31 opposite slot 13, though other non-slot surface could be included in this definition. Indicia 20 visibly connotes a property of slot 13, for instance a cross-sectional dimension of the slot 13. For instance, if slot 13 is defined by the first and second side portions 31, 32 being spaced apart by approximately one-half an inch, and therefore dimensioned to receive a one-half inch thick member, the indicia 20 may be '½"', and so on.

Figure 4:
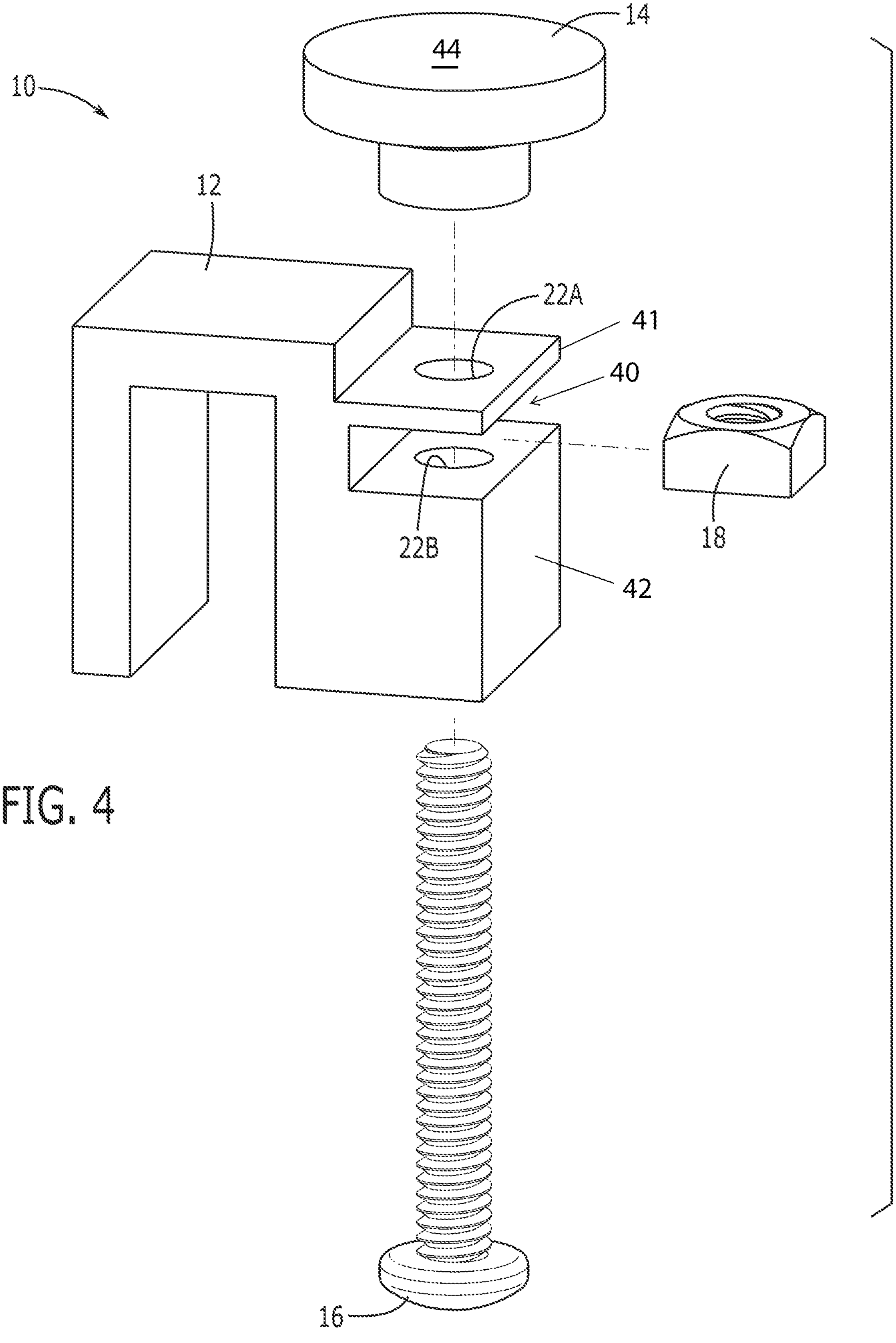
FIG. 4 is an exploded perspective view of an exemplary embodiment of the present invention.

The second side portion 32 may provide two spaced apart flanges 41, 42 protruding therefrom, thereby defining a gap 40 between the first and second flanges 41, 42, as illustrated in FIG. 4. Each flange 41, 42 provides a flange hole 22A, 22B, respectively, that align on opposing sides of the gap 40. A fastener with a threaded hole 18 (including but not limited to a nut) is dimensioned and adapted to be slidably received in the gap 40, whereby the threaded hole of the fastener 18 align with the flange holes 22A, 22B.

A threaded support rod 16, such as but not limited to a bolt or screw, is dimensioned and shaped to slide through the second flange hole 22B, then threaded through the threaded hole of the fasteners 18, and then protrude beyond the first flange hole 22A. The protruding end of the support rod 16 may engage a threaded hole of a knob 14. Opposite its threaded hole, the knob 14 provides platform 44 for engaging the fixed object 24A. The platform 44 may have an engagement surface area over twice the cross-sectional area of its threaded hole.

As a result of the urging of the support rod 16 in a first direction—defined by a direction extending from the second flange hole 22B to the first flange hole 22A—the knob 14 is likewise urged in said first direction until it engages the fixed object 24A at which time the frame 12 is urged in a second direction away from the fixed object 24A, 180-degrees opposite the first direction. When the interchangeable object 24B is in slot 13 the end portion 30 forcibly engages an edge or end portion of the interchangeable object 24B in the second direction.

Therefore, in use the clamp assembly 10 can be used to applying opposing forces between the fixed object 24A and the interchangeable object 24B, whereby the interchangeable object 24B can be selectively secured in a spaced apart relationship relative the fixed object 24A, depending on how far the support rod 16 is threaded through the fastener 18. Though not shown in the Figures, the opposing edge or end portion of the interchangeable object 24B is engaged directly by another fixed object, such as a floor, or indirectly and selectively by another clamp assembly 10.

Accordingly, the present invention removably secures a semi-moveable object in a space defined and bounded by two opposing fixed objects, such as within the bounds of fenestration framing, between a tabletop and the floor, or within a cabinet space. For instance, the clamp assembly may be used within a window frame for holding a panel over the window, or used so that plywood may be selectively and securely fit into a compartment.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A method of selectively securing a movable panel relative to a fixed object, the method comprising:

engaging an edge of the movable panel in a slot of a clamping assembly, wherein the clamp assembly comprises:

a jack portion adjacent the slot; and a threaded shaft terminating at an engagement surface, wherein the engagement surface is configured to engage the fixed object, and wherein the threaded shaft is operatively associated with the jack portion so that selectively moving the threaded shaft in a first direction urges the slot linearly in a second direction away from the engaged fixed object, wherein the jack portion provides a threaded fastener restrained relative to the slot, wherein the threaded fastener and the threaded shaft dimensioned to selectively mate, and wherein the jack portion provides two spaced apart flanges that restrains the threaded fastener;

mating the threaded shaft via the threaded fastener in the first direction until the engagement surface engages the fixed object; and further mating the threaded shaft in the first direction until said edge of the movable panel is spaced apart from the fixed object further in the second direction.

2. The method of claim 1, wherein the slot and the gap are orthogonally offset.

* * * * *